UNITED STATES PATENT OFFICE.

WILLIAM J. KNOX, OF PITTSBURG, PENNSYLVANIA, ASSIGNOR, BY MESNE ASSIGNMENTS, TO THE HIGHLAND ELECTRO-CHEMICAL MANUFACTURING COMPANY, OF CONNELLSVILLE, PENNSYLVANIA.

SOLDERING COMPOUND.

SPECIFICATION forming part of Letters Patent No. 592,914, dated November 2, 1897.

Application filed December 10, 1896. Serial No. 615,222. (No specimens.)

*To all whom it may concern:*

Be it known that I, WILLIAM J. KNOX, a citizen of the United States, residing at Pittsburg, in the county of Allegheny and State of Pennsylvania, have invented or discovered certain new and useful Improvements in Soldering Compounds, of which improvements the following is a specification.

The invention described herein relates to certain improvements in fluxes for soldering, and has for its object the production of a compound of which the flux proper is an ingredient and the other element or elements of such character as to form a waterproof envelop or coating around the particles or atoms of flux and to be capable of removal or separation from such particles or atoms by the action of heat, so as to permit the atoms to come into contact with the surfaces to be fluxed.

The invention is hereinafter more fully described and claimed.

In the practice of my invention the carrier or envelop for the flux is formed by a material which is waterproof or non-absorbent of water and which, by preference, will become pasty or wax-like when cold or ready for use. I have found that many of the fats, oils, or waxes, whether of mineral, vegetable, or animal origin—such as vaseline, paraffin, beeswax, stearin, &c.—can be successfully used as a carrier or envelop. To any one or more of these carriers is added a suitable flux, such as chlorid of zinc, rosin, ammonia, or any salts or acids which will flux or so act upon the surfaces to be soldered that the solder will form therewith an alloy under proper conditions of heat. The flux is added to the carrier or envelop in such condition— *i. e.*, finely powdered or more minutely subdivided in the form of a saturated solution— as to render it capable of being so intimately mixed by stirring or beating that each atom of the flux will be surrounded or coated with the carrier or enveloping material.

While any of the enveloping materials above specified may be used in connection with any of the fluxes, it is preferred to use vaseline or paraffin or a mixture of the two with chlorid of zinc, especially when the compound is to be used in soldering parts of electric devices, such as the ends of wires, &c., as the vaseline and paraffin are good non-conductors, and portions thereof not volatilized by heat will assist in insulating the joint, &c. In preparing the compound the vaseline is melted and the chlorid of zinc is reduced to a state of fine minute subdivision, preferably by dissolving in water or muriatic acid to form a saturated solution. The liquid vaseline and flux are then placed in a suitable vessel provided with a beater and thoroughly mingled. The vaseline should be kept liquid until a thorough mixing has been effected, and is then cooled by the application of water or any cooling medium to the containing vessel, care being taken to continue the stirring until the compound has cooled sufficiently to prevent any separation of the vaseline and flux.

When greater consistency is desired, paraffin may be mixed with the vaseline, which is melted and the paraffin dissolved therein, or both materials may be melted and mixed together. While the materials are in a liquid condition the flux is added either as a fine powder or in a solution, as described. The materials are then thoroughly commingled in the manner described, the vaseline and paraffin being maintained in a liquid condition until thorough intermixture has been attained and then cooled, agitation being continued until all liability of separation has passed.

I have found that a mixture in the proportion of one part of paraffin, four parts of vaseline, and two parts of flux, as chlorid of zinc, will form a compound of desirable consistency, which, however, may be increased or diminished by changing the proportions of paraffin and vaseline.

A flux may be mixed with paraffin alone in the manner described and also with stearin, beeswax, or any suitable animal, vegetable, or mineral wax. When using such waxes, the resulting compound will be hard when cold, and consequently the surfaces to be fluxed should be heated, so as to permit of the compound being spread evenly over such surfaces. The stearin or other animal or vegetable wax may be softened by the addition of vaseline, so as to form with the flux a pasty semifluid compound which can be applied evenly to the surfaces when cold.

When rosin is used as the flux, it is preferred to mingle it with vaseline alone, for the reason that a compound of rosin and any of the waxes or fats which become stiff when cold form too hard a substance to be conveniently used.

It will be readily understood that ammoniacal salts or other fluxes may be substituted for the chlorid of zinc in any of the compounds or mixtures described.

I claim herein as my invention—

1. A soldering compound consisting of a mixture of a finely-divided flux and a waterproof or non-absorbent carrier adapted to form an envelop around the particles or atoms of flux, and capable of being rendered fluid by heat, so as to permit of the flux being brought into contact with the surfaces to be soldered, substantially as set forth.

2. A soldering compound consisting of a mixture of a finely-divided flux, and a waterproof or non-absorbent and non-conducting carrier adapted to form an envelop around the particles or atoms of flux, and capable of being rendered fluid by heat, so as to permit of the flux being brought into contact with the surfaces to be soldered, substantially as set forth.

3. A soldering compound consisting of a mixture of a finely-divided flux and vaseline, substantially as set forth.

4. A soldering compound consisting of a finely-divided flux, vaseline and paraffin, substantially as set forth.

5. A soldering compound consisting of a mixture of a finely-divided flux, and a hydrocarbon wax or paste, substantially as set forth.

6. A soldering compound consisting of a mixture of a finely-divided chlorid of zinc and a hydrocarbon paste or wax, substantially as set forth.

In testimony whereof I have hereunto set my hand.

WILLIAM J. KNOX.

Witnesses:
F. E. GAITHER,
DARWIN S. WOLCOTT.